United States Patent
Lyu et al.

(10) Patent No.: US 12,256,366 B2
(45) Date of Patent: Mar. 18, 2025

(54) WIRELESS COMMUNICATION METHOD, TERMINAL, AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: QUECTEL WIRELESS SOLUTIONS CO., LTD., Shanghai (CN)

( * ) Notice: Subject to any disclaimer, the term of this patent is extended or adjusted under 35 U.S.C. 154(b) by 0 days.

(21) Appl. No.: 18/401,145

(22) Filed: Dec. 29, 2023

(65) Prior Publication Data
US 2024/0188036 A1 Jun. 6, 2024

Related U.S. Application Data

(63) Continuation of application No. 18/326,707, filed on May 31, 2023, which is a continuation of application No. PCT/CN2021/139940, filed on Dec. 21, 2021.

(30) Foreign Application Priority Data

Dec. 1, 2021 (CN) .......................... 202111455574.4

(51) Int. Cl.
*H04W 72/23* (2023.01)
*H04W 68/02* (2009.01)
(Continued)

(52) U.S. Cl.
CPC ......... *H04W 68/02* (2013.01); *H04W 72/232* (2023.01); *H04W 76/20* (2018.02)

(58) Field of Classification Search
CPC ..... H04W 68/02; H04W 68/04; H04W 16/28; H04W 68/00; H04W 68/005; H04B 7/0626; H04B 7/0617
See application file for complete search history.

(56) References Cited

U.S. PATENT DOCUMENTS

2019/0045481 A1* 2/2019 Sang ..................... H04B 1/713
2020/0107267 A1   4/2020 Wu et al.
(Continued)

FOREIGN PATENT DOCUMENTS

CN     110474708      11/2019
CN     112118615      12/2020
(Continued)

OTHER PUBLICATIONS

PCT International Search Report and Written Opinion in International Appln. No. PCT/CN2021/139940, dated Apr. 28, 2022, 8 pages (partial English translation).
(Continued)

*Primary Examiner* — Chi Ho A Lee
(74) *Attorney, Agent, or Firm* — Fish & Richardson P.C.

(57) ABSTRACT

The present application provides a wireless communication method, a terminal, and a network device. One example method includes: receiving, by a terminal in a first terminal group, PEI sent by a network device, wherein terminal belongs to a terminal group, the PEI indicates whether at least one terminal in the terminal group is to receive paging indication information, and the terminal group corresponds to a paging occasion (PO) group.

20 Claims, 4 Drawing Sheets

(51) Int. Cl.
*H04W 72/232* (2023.01)
*H04W 76/20* (2018.01)

(56) References Cited

U.S. PATENT DOCUMENTS

| | | | |
|---|---|---|---|
| 2021/0160814 A1 | 5/2021 | Wang et al. | |
| 2022/0046585 A1 | 2/2022 | Wu et al. | |
| 2022/0225237 A1* | 7/2022 | He | H04W 68/005 |
| 2022/0232514 A1 | 7/2022 | Tseng et al. | |
| 2022/0271878 A1* | 8/2022 | Lin | H04L 5/005 |
| 2022/0312369 A1* | 9/2022 | He | H04W 52/0216 |
| 2023/0017853 A1 | 1/2023 | Xu et al. | |
| 2023/0023161 A1* | 1/2023 | Liu | H04W 72/1263 |
| 2023/0037852 A1 | 2/2023 | Islam et al. | |
| 2023/0043139 A1* | 2/2023 | Hwang | H04W 72/23 |
| 2023/0093248 A1 | 3/2023 | Kim | |
| 2023/0133097 A1* | 5/2023 | Xu | H04W 68/025 455/458 |
| 2023/0143475 A1 | 5/2023 | Wu et al. | |
| 2023/0144750 A1 | 5/2023 | Agiwal et al. | |
| 2023/0171131 A1* | 6/2023 | Takahashi | H04L 27/26132 375/260 |
| 2023/0171731 A1 | 6/2023 | Abedini et al. | |
| 2023/0209462 A1* | 6/2023 | Tsai | H04W 52/0235 370/311 |
| 2023/0247555 A1 | 8/2023 | Wagner | |
| 2023/0309060 A1* | 9/2023 | Xu | H04W 52/0216 |
| 2023/0328690 A1* | 10/2023 | Xu | H04W 72/232 370/329 |
| 2023/0362889 A1* | 11/2023 | Xu | H04W 8/24 |
| 2023/0388927 A1* | 11/2023 | Yang | H04W 68/02 |
| 2024/0031983 A1* | 1/2024 | Ye | H04W 68/02 |
| 2024/0049182 A1* | 2/2024 | Zhou | H04L 5/0051 |

FOREIGN PATENT DOCUMENTS

| | | |
|---|---|---|
| CN | 112136349 | 12/2020 |
| CN | 112788746 | 5/2021 |
| CN | 113056951 | 6/2021 |
| CN | 113163476 | 7/2021 |
| CN | 113170282 | 7/2021 |
| EP | 4320950 | 2/2024 |
| WO | WO 2020135019 | 7/2020 |
| WO | WO 2021189461 | 9/2021 |

OTHER PUBLICATIONS

Office Action in Chinese Appln. No. 202111455574.4, dated Oct. 26, 2022, 14 pages (with English translation).
Office Action in Chinese Appln. No. 202111455574.4, dated Jan. 19, 2023, 10 pages (Machine English translation).
Notice of Allowance in Chinese Appln. No. 202111455574.4, dated Apr. 11, 2023, 6 pages (Machine English translation).
CMCC, "Discussion on paging enhancement," 3GPP TSG RAN WG1 #103-e, R1-2008021, e-Meeting, Oct. 26-Nov. 13, 2020, 8 pages.
Extended European Search Report in European Appln No. 21966234. 3, dated Oct. 23, 2024, 10 pages.
MediaTek Inc., "Evaluation methodology and paging enhancements for idle/inactive mode UE power saving" 3GPP TSG RAN WG1 #102-e, R1-2005615, e-Meeting, Aug. 17-28, 2020.

* cited by examiner

WIRELESS COMMUNICATION METHOD, TERMINAL, AND NETWORK DEVICE

CROSS-REFERENCE TO RELATED APPLICATIONS

This application is a continuation of U.S. patent application Ser. No. 18/326,707, filed on May 31, 2023, which is a continuation of International Application No. PCT/CN2021/139940, filed on Dec. 21, 2021, which claims priority to Chinese Patent Application No. 202111455574.4, filed with the China National Intellectual Property Administration on Dec. 1, 2021, and entitled "WIRELESS COMMUNICATION METHOD, TERMINAL, AND NETWORK DEVICE." All of the afore-mentioned patent applications are hereby incorporated by reference in their entireties.

TECHNICAL FIELD

This application relates to the field of communications technologies, and in particular, to a wireless communication method, a terminal device, and a network device.

BACKGROUND

To reduce terminal power consumption and network overheads, a solution for transmitting a paging early indication (PEI) based on a terminal group is discussed, that is, the PEI is used to indicate whether the terminal group needs to receive paging indication information. However, as to how to determine a time domain resource location corresponding to a terminal group, or on which time domain resources a terminal in the terminal group receives paging indication information, currently, there is no explicit solution.

SUMMARY

The present application provides a wireless communication method, a terminal, and a network device, to enable a terminal group to specify a time domain resource location at which the terminal group receives paging indication information.

According to a first aspect, a wireless communication method is provided, including: receiving, by a terminal in a first terminal group, first PEI sent by a network device, where the first PEI is used to indicate whether the terminal in the first terminal group to receive paging indication information, and the first terminal group corresponds to a first PO group.

According to a second aspect, a wireless communication method is provided, including: sending, by a network device, first PEI to a terminal in a first terminal group, where the first PEI is used to indicate whether the terminal in the first terminal group to receive paging indication information, and the first terminal group corresponds to a first PO group.

According to a third aspect, a terminal is provided, the terminal is a terminal in a first terminal group, and the terminal includes: a receiving unit, configured to receive first PEI sent by a network device, where the first PEI is used to indicate whether the terminal in the first terminal group to receive paging indication information, and the first terminal group corresponds to a first PO group.

According to a fourth aspect, a network device is provided, including: a sending unit, configured to send first PEI to a terminal in a first terminal group, where the first PEI is used to indicate whether the terminal in the first terminal group to receive paging indication information, and the first terminal group corresponds to a first PO group.

According to a fifth aspect, a terminal is provided, including a processor, a memory, and a communications interface. The memory is configured to store one or more computer programs, and the processor is configured to call the computer programs in the memory to cause the terminal device to perform some or all of the steps in the method according to the second aspect.

According to a sixth aspect, a network device is provided, including a processor, a memory, and a communications interface. The memory is configured to store one or more computer programs, and the processor is configured to call the computer programs in the memory to cause the network device to perform some or all of the steps in the method according to the second aspect.

According to a seventh aspect, an embodiment of the present application provides a communications system, and the system includes the terminal and/or the network device described above. In another possible design, the system may also include another device interacting with the terminal or the network device in the solution provided in the embodiments of the present application.

According to an eighth aspect, an embodiment of the present application provides a computer-readable storage medium. The computer-readable storage medium stores a computer program, and the computer program causes a terminal to perform some or all of the steps in the method according to the first aspect.

According to a ninth aspect, an embodiment of the present application provides a computer-readable storage medium. The computer-readable storage medium stores a computer program, and the computer program causes a network device to perform some or all of the steps in the method according to the second aspect.

According to a tenth aspect, an embodiment of the present application provides a computer program product. The computer program product includes a non-transitory computer-readable storage medium storing a computer program, and the computer program is operable to cause a terminal to perform some or all of the steps in the method according to the first aspect. In some implementations, the computer program product may be a software installation package.

According to an eleventh aspect, an embodiment of the present application provides a computer program product. The computer program product includes a non-transitory computer-readable storage medium storing a computer program, and the computer program is operable to cause a network device to perform some or all of the steps in the method according to the second aspect. In some implementations, the computer program product may be a software installation package.

According to a twelfth aspect, an embodiment of the present application provides a chip. The chip includes a memory and a processor, and the processor may call and run a computer program from the memory to implement some or all of the steps in the method according to the first aspect or the second aspect.

A corresponding PO group is set for a terminal group, and when a terminal group in which a terminal is located needs to receive paging indication information, the terminal may receive the paging indication information on the corresponding PO group, so that the terminal group specifies a time domain resource location at which the terminal group receives the paging indication information. In addition, determining the time domain resource location corresponding to the terminal group by using a PO as granularity is also simple in implementation.

DETAILED DESCRIPTIONS OF THE EMBODIMENTS

The technical solutions in the present application are described below with reference to the accompanying drawings.

Figure 1:
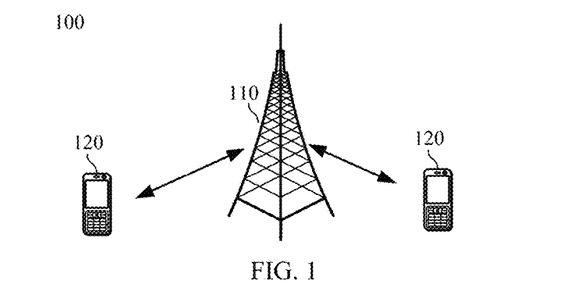
FIG. 1 shows a wireless communications system to which an embodiment of the present application is applied.
Figure 2:
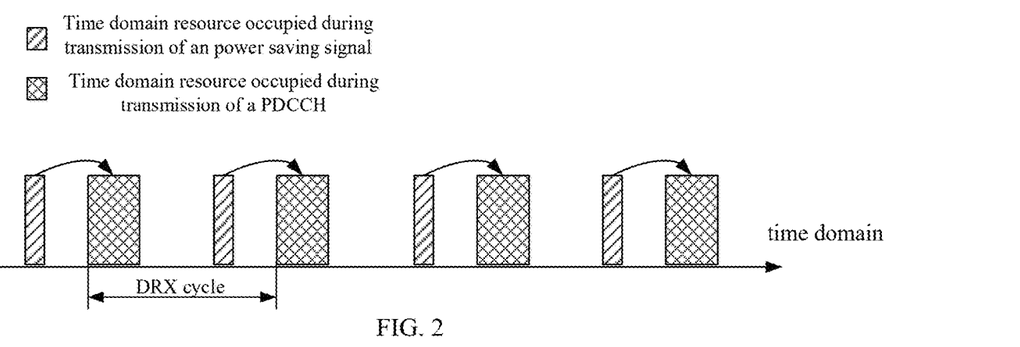
FIG. 2 shows a communication process of a DRX mechanism based on a power saving signal.

FIG. 1 shows a wireless communications system 100 to which an embodiment of the present application is applied. The wireless communications system 100 may include a network device 110 and a terminal device 120. The network device 110 may be a device in communication with the terminal device 120. The network device 110 may provide communication coverage for a specific geographic area, and may communicate with a terminal device 120 located within the coverage.

FIG. 1 exemplarily shows one network device and two terminals. Optionally, the wireless communications system 100 may include a plurality of network devices, and another quantity of terminal devices may be included in the coverage of each network device, which is not limited in this embodiment of the present application.

Optionally, the wireless communications system 100 may further include other network entities such as a network controller and a mobility management entity, which is not limited in this embodiment of the present application.

It should be understood that the technical solutions in the embodiments of the present application may be applied to various communications systems, for example, a 5th generation (5G) system or new radio (NR) system, a long term evolution (LTE) system, an LTE frequency division duplex (FDD) system, and an LTE time division duplex (TDD). The technical solutions provided in the present application may also be applied to future communications systems, such as a 6th generation mobile communications system and a satellite communications system.

The terminal device in the embodiments of the present application may also be referred to as a user equipment (UE), an access terminal, a subscriber unit, a subscriber station, a mobile, a mobile station (MS), a mobile terminal (MT), a remote station, a remote terminal, a mobile device, a user terminal, a terminal, a wireless communications device, a user agent, or a user apparatus. The terminal device in the embodiments of the present application may be a device providing a user with voice and/or data connectivity and capable of connecting people, objects, and machines, such as a handheld device or vehicle-mounted device having a wireless connection function. The terminal device in the embodiments of the present application may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the UE may be used to act as a base station. For example, the UE may act as a scheduling entity, which provides a sidelink signal between UEs in V2X or D2D, or the like. For example, a cellular phone and a car communicate with each other using a sidelink signal. A cellular phone and a smart home device communicate with each other, without relay of a communication signal through a base station.

The network device in the embodiments of the present application may be a device for communicating with the terminal device. The network device may also be referred to as an access network device or a wireless access network device. For example, the network device may be a base station. The network device in the embodiments of the present application may be a radio access network (RAN) node (or device) that connects the terminal device to a wireless network. The base station may broadly cover various names in the following, or may be interchangeable with the following names, for example, a NodeB, an evolved NodeB (eNB), a next generation NodeB (gNB), a relay station, an access point, a transmitting and receiving point (TRP), a transmitting point (TP), a master eNB MeNB, a secondary eNB SeNB, a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip arranged in the device or apparatus described above. Alternatively, the base station may be a mobile switching center, a device that functions as a base station in device to device D2D, vehicle-to-everything (V2X), and machine-to-machine (M2M) communications, a network-side device in a 6G network, a device that functions as a base station in a future communications system, or the like. The base station may support networks of the same or different access technologies. A specific technology and specific device form used by the network device are not limited in the embodiments of the present application.

The base station may be fixed or mobile. For example, a helicopter or drone may be configured to act as a mobile base station, and one or more cells may move according to the location of the mobile base station. In other examples, a helicopter or drone may be configured to serve as a device in communication with another base station.

In some deployments, the network device in the embodiments of the present application may be a CU or a DU, or the network device includes a CU and a DU. The gNB may further include an AAU.

The network device and the terminal device may be deployed on land, including indoor or outdoor, handheld or vehicle-mounted; or may be deployed on water; or may be deployed on an airplane, a balloon, and a satellite in the air. In the embodiments of the present application, the scenarios where the network device and the terminal device are located are not limited.

It should be understood that all or some of the functions of the communications device in the present application may also be implemented by software functions running on hardware, or by virtualization functions instantiated on a platform (such as a cloud platform).

For ease of understanding, the communication processes involved in the embodiment of the present application are first described below with reference to FIG. 2 to FIG. 6.

DRX

To reduce terminal power consumption, there is a DRX mechanism in both the LTE system and the NR system, so that a receiver of the terminal does not need to be always turned on when there is no data for receiving, but enters a discontinuous reception state, thereby achieving a purpose of power saving. The DRX mechanism includes configuring a DRX cycle for a terminal that is in a radio resource control (RRC) connected state. One DRX cycle consists of an active period (on duration) and an inactive period (opportunity for DRX). During the active period, the terminal monitors and receives downlink channels including a physical downlink control channel (PDCCH) and signals. During the inactive period, the terminal does not receive downlink channels such as a PDCCH and signals, so as to reduce power consumption.

In evolution of the 5G system, a higher requirement is placed on power saving of a terminal. For the conventional DRX mechanism, in each active period, a terminal needs to continuously detect a PDCCH to determine whether a network device schedules data to the terminal. For most terminals, however, there may be no need to receive data transmissions for a long period of time, but there is still a need to maintain a periodic wake-up to monitor a possible downlink transmission. There is room for further optimization of a power saving manner for such terminals.

Therefore, in the 5G R16 standard, a power saving signal is introduced to achieve further power saving. The power saving signal may be used in combination with the DRX mechanism, refer to FIG. 2. Thus, before entering the DRX active period, a terminal may first determine, based on indication of a power saving signal, whether there is a need to receive data during the DRX active period. When there is data transmission in one DRX cycle for the terminal, the power saving signal wakes up the terminal, and accordingly, the terminal monitors the PDCCH during the DRX active period. On the contrary, when there is no data transmission in one DRX cycle for the terminal, the power saving signal cannot wake up the terminal, and accordingly, the terminal does not need to monitor the PDCCH during the DRX active period. According to the DRX mechanism combined with the power saving signal, in one DRX cycle, if the power saving signal does not wake up the terminal, the terminal does not need to monitor the PDCCH even in the DRX active period, thereby realizing power saving.

Figure 3:
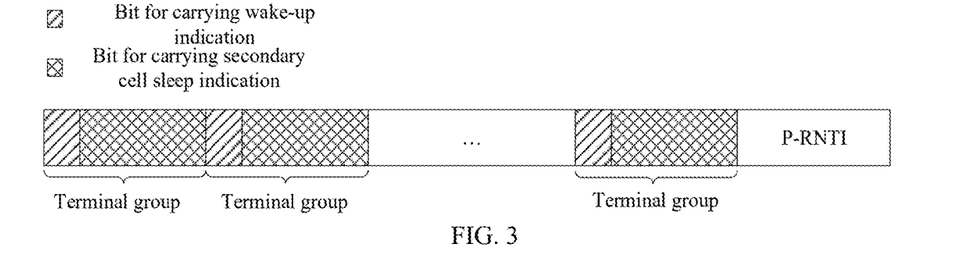
FIG. 3 shows a structure of a power saving signal.

As specified in the R16 standard, the power saving signal may be carried by using a newly defined downlink control information (DCI) format 2_6. Accordingly, a network device may configure a search space set for the terminal to detect the PDCCH carrying the DCI format 2_6. In the power saving signal, a quantity of bits required by a single user is at most 6, of which 1 bit represents wake-up indication for indicating whether the terminal needs to be woken up. The other 5 bits represent secondary cell sleep indication. Certainly, if the power saving signal may carry indication bits of a plurality of terminals, it is advantageous to improve use efficiency of transmission resources. FIG. 3 shows a structure of a power saving signal. Referring to FIG. 3, a power saving signal alone may indicate a terminal group. Wake-up indication of the terminal group may occupy a start location of DCI, and secondary cell sleep indication of each terminal in the terminal group may occupy the remaining bits in the DCI. In addition, a tail end signal of the power saving signal may be scrambled by a paging radio network temporary identity (P-RNTI). In some cases, there must be wake-up indication in the power saving signal, but a quantity of bits occupied by the secondary cell sleep indication may be 0. In addition, a network device also notifies the terminal of a total quantity of bits of the DCI and the P-RNTI for scrambling a PDCCH, so that the terminal correctly receives the power saving signal.

Generally, there is a mapping relationship in time domain between a monitoring occasion of the PDCCH used to obtain the power saving signal and a time window of the DRX active period. The network device configures a time offset PS-offset to the terminal for determining a start point of a PDCCH monitoring occasion. After determining the start point of the PDCCH monitoring occasion, the terminal further needs to determine an end point of the PDCCH monitoring occasion, and the end point of the PDCCH monitoring occasion is determined by a capability of the terminal. The terminal needs to perform operations such as device wakeup and initialization after wakeup within a minimum time interval before the DRX active period. Therefore, the terminal cannot monitor the power saving signal within the minimum time interval before the DRX active period. The minimum time interval may be shorter for a terminal with a higher processing speed, but may be longer for a terminal with a lower processing speed. Table 1 lists corresponding minimum time intervals for terminals of different capabilities with the same subcarrier spacing. The value 1 of the minimum time interval indicates a quantity of slots occupied by the minimum time interval corresponding to a terminal with a stronger capability. The value 2 of the minimum time interval indicates a quantity of slots occupied by the minimum time interval corresponding to a terminal with a weaker capability.

TABLE 1

| Subcarrier spacing | Minimum time interval | |
|---|---|---|
| (kHz) | Value 1 | Value 2 |
| 15 | 1 | 3 |
| 30 | 1 | 6 |

TABLE 1-continued

| Subcarrier spacing | Minimum time interval | |
|---|---|---|
| (kHz) | Value 1 | Value 2 |
| 60 | 1 | 12 |
| 120 | 2 | 24 |

Figure 4:
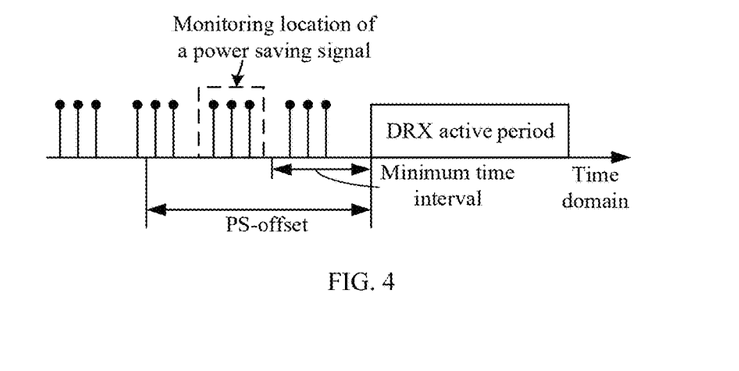
FIG. 4 is a schematic diagram of a monitoring location of a power saving signal.

FIG. 4 is a schematic diagram of a monitoring location of a power saving signal. Referring to FIG. 4, a time domain resource indicated by PS-offset is used as a start time domain resource of time domain resources occupied by a power saving signal, and the power saving signal is monitored in a complete PDCCH monitoring occasion following the start time domain resource. Moreover, a quantity of time domain resources between a location of the last time domain transmission unit of the time domain resources occupied by the power saving signal and the first time domain resource of a DRX active period is greater than a quantity of time domain resources included in a minimum time interval. PS-offset may be configured by a network device. In addition, the PDCCH monitoring occasion may be defined by a parameter of a PDCCH search space, namely, duration.

A process in which a terminal receives data using a DRX mechanism is described above with reference to FIG. 2 to FIG. 4. For a terminal in an RRC idle state, a paging message is generally received in a manner similar to the DRX mechanism. There is one paging occasion (PO) in a DRX cycle. The terminal receives the paging message only in a PO period, and does not receive the paging message at a time other than the paging occasion, so as to achieve purpose of power saving. In addition, during the PO period, the terminal may determine whether there is a paging message by detecting a PDCCH scrambled with a P-RNTI. A paging process is described below with reference to FIG. 5 and FIG. 6.

Paging Process

For a terminal device in an RRC idle state, if a network device wants to send a downlink message or downlink data to the terminal device, the network device may make the terminal device switch to an RRC connected state by paging. The paging process may be used to send a paging request to the terminal in an RRC idle state, or the paging process may also be used to notify the terminal of an update of system information, or the paging process may also be used to instruct the terminal to receive alarm information sent by an earthquake and tsunami warning system (ETWS) and a commercial mobile alert system (CMAS).

Figure 5:
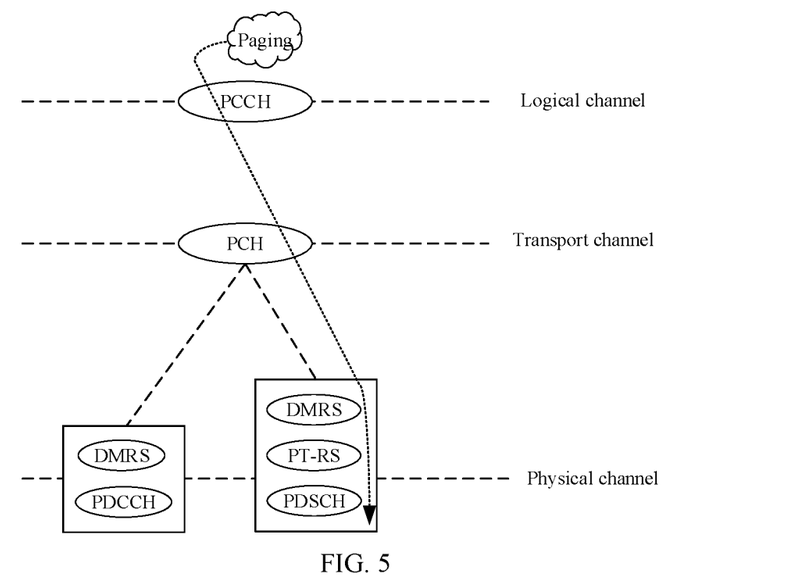
FIG. 5 is a diagram of paging logic.

FIG. 5 is a diagram of paging logic. As can be learned from FIG. 5, an entire paging process is mapped from a logical channel to a transport channel, and finally to a physical channel. A demodulation reference signal (DMRS) may be used for demodulation of uplink and downlink data.

The paging process may be triggered by a core network or by a base station. The core network may be, for example, an access and mobility management function (AMF). If a paging message is originated by a core network device, the core network device sends the paging message to all base stations in a tracking area (TA) registered by the terminal. After receiving the paging message sent by the core network device, the base station interprets contents of the paging message to obtain a tracking area identity (TAI) list of the paged terminal, and performs air interface paging in a cell that belongs to a tracking area in the list. Generally, to reduce overheads of transmitting the paging message, after receiving the paging message sent by the core network device, the base station may aggregate paging messages corresponding to terminals with a same PO into one paging message, and finally transmit the paging message to a related terminal through a paging channel. After receiving the paging message, a terminal in an RRC idle state may initiate an RRC connection setup process to receive data or signaling.

The paging message is carried in a physical downlink shared channel (PDSCH). Before receiving the paging message, a terminal needs to first receive a paging parameter through a system message, and then calculate a frame number of a paging frame (PF) in which the paging message is located and a PO in combination with its own UE_ID. Then, the terminal receives paging indication information by monitoring a PDCCH scrambled by a P-RNTI in the PO on the PF, and finally receives the paging message based on the paging indication information. It may be understood that the paging indication information is carried in the PDCCH, and the paging message may be used to indicate a resource location of a PDSCH that carries the paging message.

For example, the terminal may detect a PDCCH in the PO to obtain DCI, and cyclic redundancy check (CRC) of the DCI is scrambled by the P-RNTI. If the DCI is detected, the terminal device may receive the PDSCH at a resource location (for example, a time domain resource location and/or a frequency domain resource location) indicated by the DCI. The terminal device may decode the PDSCH by using a temporary mobile subscriber identity (TMSI) (for example, 5G-S-TMSI). If the decoding is successful, it indicates that the terminal device is paged and the terminal obtains the paging message from the PDSCH. If the decoding fails, it indicates that the terminal device is not paged.

Figure 6:
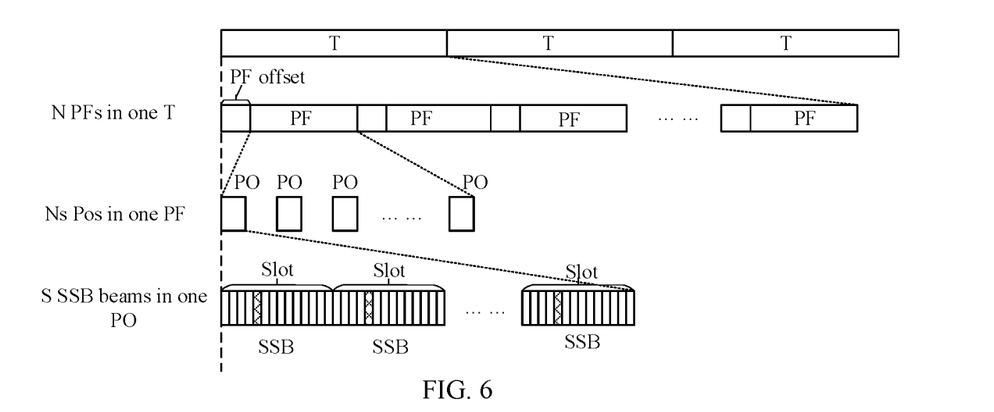
FIG. 6 shows a location of a PF in a DRX cycle and a location of a PO in a PF.

The PF indicates a frame number of a system frame at which the paging message should appear, and the PO indicates a time at which the paging message may appear. FIG. 6 shows a location of a PF in a DRX cycle and a location of a PO in a PF. As shown in FIG. 6, a PF is located within a DRX cycle (or paging cycle) T, one paging cycle includes N PFs, one PF includes Ns POs, and one PO includes S slots or synchronization signal block (SSB) beams, where N, Ns, and S are all positive integers. A plurality of POs in a paging cycle may correspond to different terminals. However, for a specific terminal, in one paging cycle, the terminal only needs to monitor its PO.

As described above, the terminal may calculate a PF and a PO based on a UE identity (ID). In some implementations, a system frame corresponding to a system frame number (SFN) satisfying the formula (SFN+PF_offset) mod T=(T div N)*(UE_ID mod N) may be used as a PF, and an index i_s of the PO corresponding to the terminal may be calculated based on the formula i_s=floor (UE_ID/N) mod Ns within the PF. T denotes a cycle length of a paging cycle of the terminal; UE_ID is used to identify a terminal; N denotes a quantity of PFs within the paging cycle; Ns denotes a quantity of POs within one PF; and PF_offset denotes a frame offset of the PF.

It should be noted that, for a terminal, if a default DRX cycle is different from a DRX cycle configured for the terminal, a cycle length of the shorter DRX cycle of the two DRX cycles may be selected as the above-mentioned T. That is, T=min(T_UE, T_sib), where T_sib denotes a cycle length of the default DRX cycle indicated in a system message, and T_UE denotes a cycle length of the DRX cycle configured for the terminal. Certainly, for a terminal that is not configured with T_UE, the cycle length of the default DRX cycle indicated in the system message may be used as a value of T, that is, T=T_sib.

It should also be noted that, the UE_ID may be calculated by the formula UE_ID=(5G-S-TMSI mod 1024), where 5G-S-TMSI denotes a TMSI allocated by a communications system to a terminal.

In addition, in the NR technology, for a terminal in an RRC idle state, a network device does not know which transmit beam is used to send a paging message to the terminal. To ensure that the terminal may receive the paging message, the network device sends the paging message in a beam sweeping manner. To support multi-beam transmission of the paging message, the PO may be defined as a group of PDCCH monitoring occasions, and different PDCCH monitoring occasions correspond to paging indication information sent through different transmit beams. One PF may include one or more POs or starting point of a PO.

Since each SSB index corresponds to a PDCCH monitoring occasion, and different SSB indexes correspond to different beams, a plurality of PDCCH monitoring occasions in one PO may be associated with transmit beams corresponding to different SSB indexes to support multi-beam transmission of the paging message. The messages transmitted on each SSB beam are identical. Generally, SSBs required to complete one time of beam sweeping constitute an SSB burst. PDCCH monitoring occasions are a series of time domain locations determined by a paging search space.

Numbering of the PDCCH monitoring occasions starts from the first PDCCH monitoring occasion of a PF, and ends before a next PF. APO is a set of S consecutive PDCCH monitoring occasions, where S is a quantity of actual transmitted SSBs. A number of a start PDCCH monitoring occasion of each PO may be determined by a parameter firstPDCCH-MonitoringOccasionOfPO. If this parameter exists, the number of the start PDCCH monitoring occasion of the (i_s+1)th PO is the (i_s+1)th value of the parameter. If this parameter does not exist, all PDCCH monitoring occasions sequentially constitute POs one by one, and the number of the start PDCCH monitoring occasion of the (i_s+1)th PO is i_s*S.

It should also be noted that, PDCCH monitoring occasions constituting one PO may be located in one PF or two PFs, that is, the PDCCH monitoring occasions included in one PO may be monitoring occasions across frames.

Based on the foregoing description, it may be learned that a terminal periodically monitors a PDCCH in a PO in a manner similar to the DRX mechanism, with a paging cycle as a cycle, to obtain paging indication information. However, for some terminals, they may not be paged for a long time, but still need to keep awake periodically to monitor a PDCCH that possibly carries paging indication information. There is room for further optimization of a power saving manner for such terminals.

To further optimize the power saving manner of a terminal, a solution for further saving terminal energy based on PEI is discussed. In this solution, a network device sends PEI to a terminal, and the PEI may be sent before arrival of a PO in each paging cycle, or may be sent once in a plurality of paging cycles, or may be sent a plurality of times in one paging cycle. The PEI may be used to indicate whether the terminal needs to receive a PDCCH carrying paging indication information, or the PEI may be used to indicate whether the terminal needs to receive paging indication information, or the PEI may be used to indicate whether the terminal needs to be woken up. The terminal is woken up only when the PEI indicates that the terminal needs to receive paging indication information. Otherwise, if the PEI indicates that the terminal does not need to receive the paging indication information, the terminal maintains a sleep state to save power. However, in the PEI indication-based solution, the network device needs to indicate whether each terminal to receive paging indication information, which causes significant network overheads.

To reduce network overheads, a solution for transmitting PEI based on a terminal group (or subgroup, or UE group) is discussed, where one terminal group may include a plurality of terminals. That is to say, the PEI may be used to indicate whether the terminal group needs to receive paging indication information. When one or more terminals in the terminal group are paged, the network device may send PEI to the terminals in the terminal group to instruct the terminals in the terminal group to receive the paging indication information.

A first terminal group is used as an example. The PEI may include indication information, and the indication information may be used to indicate whether the first terminal group needs to receive paging indication information. If the indication information indicates that the first terminal group needs to receive the paging indication information, the terminals in the first terminal group are woken up and receive the paging indication information. If the indication information indicates that the first terminal group does not need to receive the paging indication information, the terminals in the first terminal group may maintain a sleep state and do not receive the paging indication information.

One piece of PEI may be used to indicate whether terminals in one or more terminal groups need to receive the paging indication information, that is, one piece of PEI may include indication information of one or more terminal groups. For example, the PEI may carry ID information of a terminal group and indication information corresponding to the terminal group. After receiving the PEI, a terminal may determine, based on ID information of a terminal group in which the terminal is located and indication information corresponding to the ID information in the PEI, whether to receive the paging indication information.

One bit representing indication information of a terminal group is used as an example. When the indication information corresponding to the terminal group is 0, it indicates that terminals in the terminal group do not need to receive the paging indication information. When the indication information corresponding to the terminal group is 1, it indicates that the terminals in the terminal group need to receive the paging indication information. For example, one piece of PEI may include the following information: a terminal group 1→0, a terminal group 2→1, and a terminal group 3→1. In this case, terminals in the terminal group 1 do not need to receive the paging indication information, and terminals in the terminal group 2 and the terminal group 3 need to receive the paging indication information. After receiving the PEI, a terminal may first determine which terminal group it belongs to, and then determine, based on the indication information corresponding to the terminal group, whether the terminal needs to receive the paging indication information.

It may be understood that, since the PEI is used to indicate whether a terminal group needs to receive the paging indication information, when the PEI indicates that the first terminal group needs to receive the paging indication information, all terminals in the first terminal group need to receive the paging indication information.

In some embodiments, in order to reduce signaling overheads, the network device may alternatively carry only ID information of a terminal group to which a terminal needing to receive the paging indication information belongs in the PEI. For a terminal group that does not need to receive the paging indication information, the PEI may not carry an ID of the terminal group. After a terminal receives PEI, if the PEI includes ID information of a terminal group to which the terminal belongs, it indicates that the terminal needs to receive the paging indication information; or if the PEI does not include ID information of a terminal group to which the terminal belongs, it indicates that the terminal does not need to receive the paging indication information.

However, for a solution in which a network device indicates, through PEI, whether a terminal group needs to receive a paging message, currently there is no explicit solution on how to determine a time domain resource location corresponding to the terminal group, or on which time domain resources a terminal in the terminal group receives paging indication information.

To resolve the foregoing problem, an embodiment of the present application provides a wireless communication method. A corresponding PO group is set for a terminal group, when a terminal group in which a terminal is located needs to receive paging indication information, a network device may send the paging indication information on a PO group corresponding to the terminal group, and the terminal may receive the paging indication information on the PO group corresponding to the terminal group, so that the terminal group specifies a time domain resource location at which the terminal group receives the paging indication information. In addition, determining the time domain resource location corresponding to a terminal group by using a PO as granularity is also simple in implementation.

Figure 7:
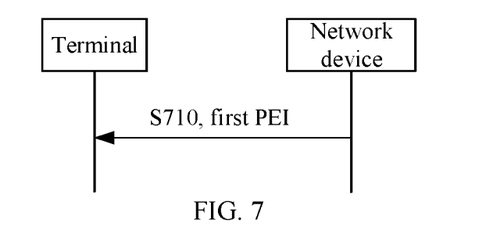
FIG. 7 is a schematic flowchart of a wireless communication method according to an embodiment of the present application.

The communication method according to an embodiment of the present application is described below with reference to FIG. 7. The method shown in FIG. 7 includes Step S710.

In Step S710, a network device sends first PEI to a terminal.

The first PEI may be used to indicate whether a first terminal group receives paging indication information. Alternatively, the first PEI is used to indicate that a first terminal group receives or does not receive paging indication information. Alternatively, the first PEI is used to indicate whether a first terminal group needs to monitor a PDCCH carrying paging indication information.

The first terminal group corresponds to a first PO group. When the first PEI instructs the first terminal group to receive the paging indication information, the terminal in the first terminal group may receive the paging indication information in the first PO group.

PO groups in the embodiment of the present application are classified by using a PO as granularity. The first PO group may include one or more POs, or the first PO group may include at least one PO.

One paging cycle includes a plurality of PO groups, and the first PO group is one of the plurality of PO groups. The POs in the first PO group may be located within one PF, and in some cases, the POs in the first PO group may alternatively be located within a plurality of different PFs. Alternatively, the PF in which the POs in the first PO group are located includes M PFs, where M is a positive integer greater than 1. For example, the PF in which the POs in the first PO group are located includes a first PF and a second PF, where the first PF and the second PF are different from each other.

The POs in the first PO group may alternatively be located in a plurality of different SSB burst sets, or an SSB burst set in which the POs in the first PO group are located includes P SSB burst sets, where P is a positive integer greater than 1. For example, the SSB burst set in which the POs in the first PO group are located includes a first SSB burst set, a second SSB burst set, and a third SSB burst set, where the first SSB burst set, the second SSB burst set, and the third SSB burst set are different from each other.

The POs in the first PO group may alternatively be located in a plurality of different paging cycles, or a paging cycle in which the POs in the first PO group are located includes Q paging cycles, where Q is a positive integer greater than 1. For example, the paging cycle in which the POs included in the first PO group are located includes a first paging cycle, a second paging cycle, a third paging cycle, and a fourth paging cycle, where the first paging cycle, the second paging cycle, the third paging cycle, and the fourth paging cycle are different from each other.

The POs in the first PO group may alternatively be located in different DRX cycles, or a DRX cycle in which the POs in the first PO group are located includes K cycles, where K is a positive integer greater than 1. For example, the DRX cycle in which the POs included in the first PO group are located includes a first DRX cycle, a second DRX cycle, and a third DRX cycle, and the first DRX cycle, the second DRX cycle, and the third DRX cycle are different from each other.

The method for determining a PO group is not specifically limited in the embodiments of the present application, and is described below in combination with specific cases.

In some embodiments, POs in a PO group are continuous, or POs in a PO group are discontinuous. In other words, a PO group may include a plurality of consecutive POs, or a PO group may include a plurality of inconsecutive POs. POs in a PO group being continuous may indicate that the POs in the PO group are a plurality of consecutive POs within a paging cycle. POs in a PO group being discontinuous may indicate that the POs in the PO group are a plurality of inconsecutive POs within a paging cycle. Certainly, to save power of a terminal device, a plurality of consecutive POs may be used as a PO group corresponding to the terminal group.

For example, it is assumed that a paging cycle includes five consecutive POs, denoted as PO1, PO2, PO3, PO4, and PO5, respectively. During classification of PO groups, consecutive PO1 and PO2 may be classified as a PO group, and consecutive PO3 and PO4 may be classified as a PO group. Alternatively, inconsecutive PO1 and PO3 may be classified as a PO group, and consecutive PO4 and PO5 may be classified as a PO group. Alternatively, inconsecutive PO1 and PO3 may be classified as a PO group, and inconsecutive PO2 and PO4 may be classified as a PO group.

A quantity of PO groups included in a paging cycle is not specifically limited in the embodiment of the present application. For example, the quantity of PO groups included in a paging cycle may be the same as a quantity of terminal groups. For another example, the quantity of PO groups included in a paging cycle may be greater than or less than a quantity of terminal groups.

The quantity of terminal groups may be a quantity of terminal groups within access network device coverage (or an RAN area), or the quantity of terminal groups may be a quantity of terminal groups within core network device coverage (or a TA area). A method for determining a terminal group will be described in detail below.

Since a quantity of terminals capable of being carried by a PO is limited, to avoid a time domain resource collision, in the embodiments of the present application, different PO groups may include different POs, in other words, POs in a plurality of PO groups within a paging cycle do not overlap. In this way, terminals in different terminal groups do not receive paging indication information at a same PO location, so that the time domain resource collision can be avoided.

Certainly, POs included in different PO groups may alternatively be partially identical to improve a utilization rate of time domain resources. If terminals in a terminal group are not paged, the time domain resources in which the PO group corresponding to the terminal group is located are idle, and a network device may transmit paging indication information of another terminal group by using the time domain resources, so as to improve a utilization rate of the time domain resources.

For simplicity of implementation, POs (or a length of a PO group) in a plurality of PO groups in a paging cycle have a same quantity. In other words, a paging cycle may include a plurality of PO groups, each of which includes a same quantity of POs. Certainly, in some cases, a quantity of POs included in different PO groups in a plurality of PO groups may alternatively be different.

The method for generating a PO group is not specifically limited in the embodiment of the present application. For example, assuming that one paging cycle includes a plurality of PO groups, POs in one paging cycle may sequentially form into a plurality of PO groups. Alternatively, the POs in one paging cycle may sequentially form a plurality of PO groups according to a quantity of POs included in the PO groups.

For example, one paging cycle includes three PO groups and one PO group includes two POs. In this case, PO1 and PO2 may form PO group 1, PO3 and PO4 may form PO group 2, and PO5 and PO6 may form PO group 3, where PO1, PO2, PO3, PO4, PO5 and PO6 are consecutive POs within one paging cycle.

Alternatively, the POs in the plurality of PO groups include all POs in one paging cycle, so that time domain resources in which the POs in the paging cycle are located are fully utilized. Alternatively, POs within one paging cycle may be equally divided into a plurality of PO groups.

In some embodiments, a terminal group is in a one-to-one correspondence with a PO group, that is, one terminal group corresponds to one PO group, and one PO group also corresponds to one terminal group. For example, assuming that a quantity of terminal groups is 10, a paging cycle may include 10 PO groups, and the 10 PO groups are in a one-to-one correspondence with the 10 terminal groups.

In some other embodiments, one terminal group may correspond to a plurality of PO groups. In a case where one terminal group corresponds to a plurality of PO groups, the terminal group may receive paging indication information on only one of the plurality of PO groups in each paging cycle. A specific PO group used by the terminal group may be specified by the network device, or may be predefined in a protocol. This is not specifically limited in the embodiments of the present application. For example, if one terminal group corresponds to a plurality of PO groups, the network device may further send indication information to a terminal to indicate a specific PO group for receiving paging indication information. Certainly, if one terminal group corresponds to a plurality of PO groups, the terminal group may alternatively receive paging indication information on each of the plurality of PO groups.

The following describes a method for determining a resource location of a PO group in combination with a formula.

For example, in FIG. 6, a paging cycle includes N*Ns POs, a quantity of terminal groups is Nsg, and a quantity of PO groups in a paging cycle is equal to a quantity of terminal groups, that is, a quantity of PO groups in a paging cycle is also Nsg.

Assuming that Nsg PO groups in a paging cycle include a same quantity of POs, a quantity of POs in a PO group is:

$$\left\lfloor \frac{N \times Ns}{Nsg} \right\rfloor,$$

where ⌊ ⌋ denotes a floor operation.

Assuming that POs in a paging cycle sequentially constitute PO groups one by one, a PF in which a first PO group is located may be calculated by the following formula:

$$\text{Terminal group } ID \times \left\lfloor \frac{N \times Ns}{Nsg} \right\rfloor / Ns$$

APO index i_s of a start PO of the first PO group in PF is as follows:

$$\text{Terminal group } ID \times \left\lfloor \frac{N \times Ns}{Nsg} \right\rfloor \mod (Ns)$$

where mod denotes a modulo operation.

It should be noted that, time domain resources occupied by the first PO group may be understood as a segment of consecutive time domain resources. In addition, only a part of the segment of consecutive time domain resources may be time domain resources corresponding to POs in the first PO group. When a terminal is switched from a non-synchronous state to a synchronous state, or switched from a sleep state to a wake-up state, a large amount of power needs to be consumed, generally about 50%-60% of the total average power consumption in one DRX cycle. Therefore, to save power of the terminal and prevent the terminal from sleeping and waking up a plurality of times in a PO group, a consecutive time period composed of a plurality of PO groups may be used as a time domain resource location corresponding to the terminal group in the embodiment of the present application. For example, a PO group includes a PO1 and PO2, and a time domain resource in which the PO group is located may be a time period from a start location of the PO1 to an end location of the PO2. When the terminal determines that paging indication information needs to be received, the paging indication information may be received in the consecutive time period.

In an example in which a first terminal group corresponds to the first PO group, terminals in the first terminal group may receive paging indication information at a same time domain resource location, or different terminals in the first terminal group may receive paging indication information at different time domain resource locations corresponding to the first PO group, which is not specifically limited in the embodiment of the present application. If a time domain resource in which the first PO group is located is recorded as a first time domain resource, the terminals in the first terminal group may simultaneously start to receive the paging indication information at a start location of the first time domain resource, or some terminals in the first terminal group start to receive the paging indication information at a start location of the first time domain resource, and some terminals start to receive the paging indication information at a time point after the start location of the first time domain resource.

For example, the first terminal group includes a terminal 1 and a terminal 2. The terminal 1 and the terminal 2 may simultaneously start to receive the paging indication information at the start location of the first time domain resource, or the terminal 1 starts to receive the paging indication information at the start location of the first time domain resource, and the terminal 2 starts to receive the paging indication information at a time location obtained after the start location of the first time domain resource is shifted by a preset duration. There is a first offset value between a time domain resource location at which the terminal 2 starts to receive the paging indication information and the start location of the first time domain resource. The first offset value may be predefined in a protocol or specified by a network device.

The terminals in the first terminal group in the embodiment of the present application receives paging indication information on the first PO group until the terminal receives its paging message or the time domain resource corresponding to the first PO group ends.

Still in an example in which the first terminal group includes a terminal 1 and a terminal 2, the terminal 1 and the terminal 2 may simultaneously start to receive paging indication information at a start location of a first time domain resource. If the terminal 1 receives its paging message, the terminal 1 may stop receiving the paging indication information. Since the terminal 2 has not received its paging message, the terminal 2 may continue to receive the paging indication information until the first time domain resource ends.

For a multi-beam transmission scenario, a terminal also needs to determine start PDCCH monitoring occasions of POs in a first PO group, and then a location of the first PO group can be determined. If the parameter firstPDCCH-MonitoringOccasionOf PO exists, the start PDCCH monitoring occasions of the POs in the first PO group may be determined based on the parameter firstPDCCH-MonitoringOccasionOf PO. For example, a number of a start PDCCH monitoring occasion of the (i_s+1)th PO group is the (i_s+1)th value of the parameter firstPDCCH-MonitoringOccasionOf PO.

If the parameter firstPDCCH-MonitoringOccasionOf PO does not exist, all PDCCH monitoring occasions in a paging circle sequentially constitute PO groups one by one according to a length of a PO group.

For example, if a PO group includes two POs, and one PO corresponds to S PDCCH monitoring occasions, the first 2*S PDCCH monitoring occasions in a paging cycle constitutes the first PO group, and the (2*S+1)th to (4*S)th PDCCH monitoring occasions constitute the second PO group, and so on.

The method for sending PEI to a network device is not specifically limited in the embodiment of the present application. The PEI may be sent periodically. The network device may send one PEI in one paging cycle, or the network device may send a plurality of pieces of PEI in one paging cycle, or the network device may send one piece of PEI in a plurality of paging cycles. For example, the network device may send first PEI before each paging cycle to indicate whether a terminal group needs to receive paging indication information during the paging cycle. For another example, the network device may send one piece of PEI in a plurality of paging cycles to indicate whether a terminal group needs to receive paging indication information during the plurality of paging cycles. For another example, the network device may send a plurality of pieces of PEI in one paging cycle to indicate whether a terminal group needs to receive paging indication information between a time for receiving the PEI and an end time of the paging cycle.

A resource location of the PEI may be indicated by the network device or may be predefined in a protocol. To reduce signaling overheads, the resource location of the PEI may reuse a resource location of another message. For example, the resource location of the PEI may be indicated by CORESET #0 or a CORESET in a system information block (SIB1).

Figure 8:
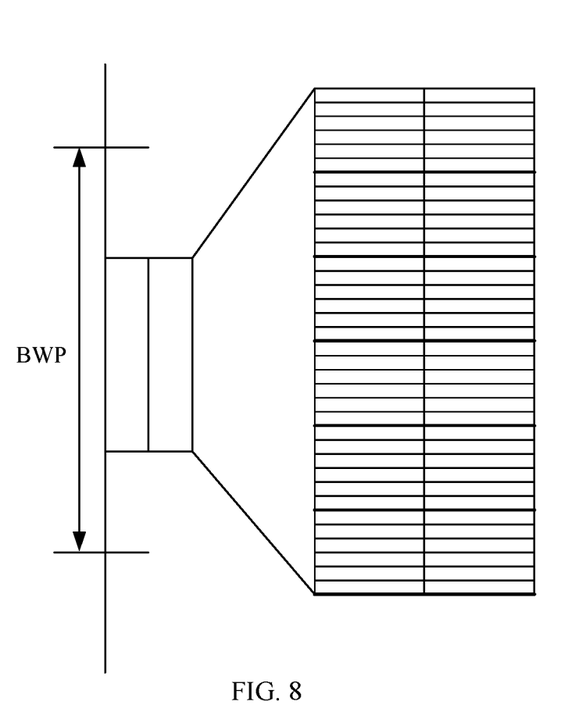
FIG. 8 is a diagram of resource mapping according to an embodiment of the present application.

In some communications systems, such as 5G, a control-resource set (CORESET) is introduced, which corresponds to a PDCCH physical resource configuration. As shown in FIG. 8, the CORESET contains a set of PRBs in frequency domain, with a minimum granularity of 6 PRBs.

The CORESET includes concepts of a control channel element (CCE) and a resource element group (REG). A control channel is aggregated by CCEs, and one CCE includes six REGs. Mapping from CCEs to REGs supports interleaving and non-interleaving. One REG consists of one RB in frequency domain and one symbol in time domain. A time domain length of the CORESET is {1, 2, 3} OFDM symbols, and a start location in the slot is configurable. Each cell is configured with a maximum of 12 CORESETs (0-11).

In an initial cell search process, a terminal obtains master information block (MIB) information, including information such as a frequency, an SFN, a subcarrier spacing, k_ssb, pdcch_ConfigSib1, and the like through a physical broadcast channel (PBCH). However, the information is insufficient for further random access by the terminal, and the terminal needs to continue to receive SIB1 information. The SIB1 information is scheduled by DCI 1-0 of a PDCCH and transmitted in a PDSCH. Specifically, a PDCCH search space type for scheduling the SIB1 is Type0-CSS, and a CORESET associated therewith is CORESET #0. That is to say, the terminal may receive the SIB1 through a resource location indicated by the CORESET #0. Information of the CORESET #0 is provided to the terminal by a MIB. The terminal obtains the information of the CORESET #0 based on information in the MIB so as to learn how to receive a remaining system message, such as SIB1. Thus, the CORESET #0 may be reused to indicate a monitoring occasion of PEI in the embodiment of the present application. After obtaining the information of the CORESET #0, the terminal may receive the PEI at the resource location indicated by the CORESET #0.

In addition, the SIB1 may further include information of another CORESET, and in the embodiment of the present application, a CORESET in the SIB1 (commonControlResourceSet in SIB1) may alternatively be used to indicate the monitoring occasion of the PEI. After obtaining the CORESET in the SIB1, the terminal may receive the PEI at the resource location indicated by the CORESET.

Paging in the embodiment of the present application may be initiated by a core network device, and the core network device may send a paging message to a base station. The paging message may include ID information of a terminal and/or ID information of a terminal group. After receiving the paging message, the base station may send first PEI to the terminal, where the first PEI carries the ID information of the terminal group.

If the terminal group is determined by the base station, when the core network device sends the paging message to the base station, the paging message may include only the ID information of the terminal. The base station determines a terminal group to which the terminal belongs based on the ID information of the terminal. The base station then sends the first PEI to the terminal based on a paged terminal group. Optionally, the first PEI may include a terminal group ID, so that the terminal determines whether paging indication information needs to be received.

If the terminal group is determined by the core network device, when the core network device sends the paging message to the base station, the paging message may carry a UE ID and the terminal group ID. The base station may directly send PEI to the terminal of the terminal group based on the terminal group ID to instruct the terminal of the terminal group to receive the paging indication information. In some embodiments, when the core network device sends the paging message to the base station, the paging message may carry only the terminal group ID, and the base station may generate the PEI based on the terminal group ID. In some other embodiments, the core network device may send, to the base station before paging, the ID information of the terminal group to which the terminal belongs, so that the base station may retain a correspondence between the terminal and the terminal group. In this case, when the core network device sends the paging message to the base station, the paging message may carry only the UE ID. After receiving the UE ID, the base station may determine the terminal group to which the terminal belongs based on the correspondence between the terminal and the terminal group. Further, the base station may send the PEI to the terminals in the terminal group based on the terminal group to instruct the terminals in the terminal group to receive the paging indication information.

The terminal group in the embodiment of the present application is described below.

The terminal groups in the embodiment of the present application may be grouped by a core network device, or may be grouped by a base station. If the terminal groups are grouped by the base station, the base station may divide the terminals within its coverage into a plurality of terminal groups. If the terminal groups are grouped by the core network device, the core network device may divide the terminals within its coverage into a plurality of terminal groups. In some embodiments, the core network device may further consider a base station to which the terminals belong when grouping, and the core network device may divide terminals belonging to one base station into one terminal group, that is to say, terminals in one terminal group belong to one base station, and terminals in coverage of different base stations belong to different terminal groups.

In the 5G communications system, a DU and a CU in a base station are independently deployed in order to better meet needs of various scenarios and applications. Therefore, the base station in the embodiment of the present application may be a gNB-DU or a gNB-CU. One gNB-CU may be connected to a plurality of gNB-DUs. The base station that groups terminals in the embodiments of the present application may be a gNB-CU or a gNB-DU. The grouping terminals by a gNB-DU helps save signaling overheads.

Cells in the 5G system constitute a larger RAN area, and RAN areas constitutes a larger tracking area. Thus, each cell belongs to one RAN area and one tracking area. The tracking area is the basis for tracking a core network level terminal, and the RAN area is the basis for tracking a radio access network level terminal. The paging message described above may be broadcast on all cells in a TA.

When the core network device performs grouping, terminals in the TA may be divided into a plurality of terminal groups. When the base station performs grouping, terminals in the RAN area may be divided into a plurality of terminal groups.

The base station and/or the core network device may perform grouping based on performance of a terminal, and the performance of the terminal may include at least one of a capability, a mode, and service information. That is to say, a terminal in a terminal group may be determined based on at least one of a terminal capability, a mode, and service information.

The terminal capability may include at least one of a supported frequency band, a category, a modulation capability, and a capability to support antenna beamforming. The frequency band supported by a terminal may be, for example, a frequency range 1 (FR1) and/or an FR2. The terminal category may include a total of 15 levels: category 1-category 15. The category level represents a capability level of a terminal, which indicates a data processing capability (download rate, upload rate) supported by the terminal, a maximum space division multiplexing capability, a modulation and coding capability, and the like.

The terminal mode may include, for example, at least one of a terminal supporting the Internet of Things, a time delay sensitive terminal, and an ordinary terminal.

The service information of a terminal may include, for example, at least one of enhance mobile broadband (eMBB), ultra reliable low latency communications (URLLC), massive machine type communication (mMTC) and the like.

According to the embodiment of the present application, terminals with same performance may be classified into a terminal group. For example, the supported FR is used as an example, and terminals supporting a same frequency band parameter may be classified into a terminal group, for example, terminals supporting FR1 are classified into a terminal group, and terminals supporting FR2 is classified into a terminal group. The category is used as an example. Terminals in category 1 may be classified into a terminal group, and terminals in category 2 may be classified into a terminal group, and so on. The terminal mode is used as an example. Terminals supporting the Internet of Things may be classified into a terminal group, delay-sensitive terminals are classified into a terminal group, and common terminals are classified into a terminal group. The service information is used as an example. Terminals having an eMBB service may be classified into a terminal group, terminals having a URLLC service may be classified into a terminal group, and terminals having an mMTC service may be classified into a terminal group.

In some embodiments, a maximum terminal quantity M of a terminal group may be set in the embodiment of the present application, where M is a positive integer. When a terminal quantity in one terminal group exceeds M, a terminal subsequently accessed is classified into another terminal group.

In some other embodiments, a maximum terminal quantity Z of a terminal group may alternatively be set in the embodiment of the present application, where Z is a positive integer. In this case, a terminal quantity in each terminal group is less than or equal to Z.

After performing terminal grouping, a base station or a core network device may further send ID information of a terminal group to a terminal, so that the terminal may determine the terminal group to which the terminal belongs, and may further determine a PO group based on the ID information of the terminal group to which the terminal belongs.

The method for sending an ID of a terminal group is not specifically limited in the embodiment of the present application. An example in which a core network device performs grouping on terminals is used. The core network device may send a terminal group ID to a terminal in a terminal registration process. For example, the core network device may send the terminal group ID to the terminal through an RRC registration accepted message, in other words, the core network device may send an RRC registration accepted message to the terminal, where the RRC registration accepted message includes an ID of the group terminal to which the terminal belongs. It may be understood that, the core network device sending a terminal group ID to the terminal may mean that the core network device sends the terminal group ID to the terminal via a base station, that is to say, the core network device first sends the terminal group ID to a base station, and then the base station sends the terminal group ID to the terminal. Certainly, in addition to sending the terminal group ID to the terminal, the core network device may further send the terminal group ID to the base station, so that the base station can learn a correspondence between the terminal and the terminal group.

An example in which a base station performs grouping on terminals is used. The base station may send a terminal group ID to a terminal in an RRC connection setup process. For example, the base station may send the terminal group ID to the terminal through an RRC configuration message or an RRC connection configuration message, in other words, the base station may send an RRC configuration message or an RRC connection configuration message to the terminal, where the RRC configuration message or an RRC connection configuration message includes an ID of a terminal group to which the terminal belongs.

Certainly, in addition to the message described above, the core network device or the base station may send the terminal group ID to the terminal through another message, which is not specifically limited in the embodiment of the present application.

A registration procedure and an RRC connection setup procedure are described below with reference to FIG. 9 and FIG. 10, respectively.

Figure 9:
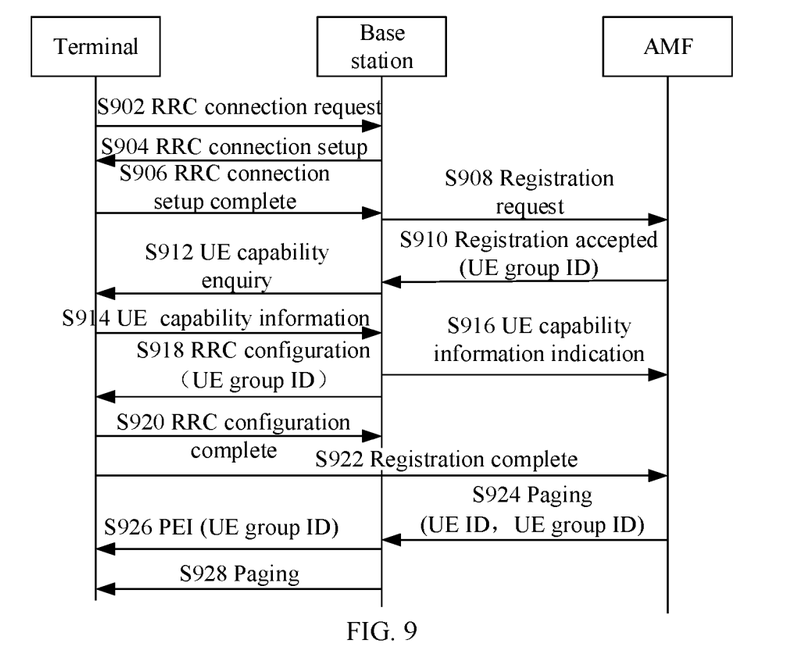
FIG. 9 is a schematic flowchart of a registration process according to an embodiment of the present application.

FIG. 9 is a schematic diagram of a procedure in which a terminal registers with a core network. The core network may send a terminal group ID to the terminal in the procedure. The method illustrated in FIG. 9 includes Step S902 to Step S928.

In Step S902, the terminal sends an RRC connection request message to a base station.

In Step S904, the base station sends an RRC connection setup message to the terminal. The RRC connection setup message may include information about setting up a signaling radio bearer (SRB0) and an SRB1 bearer, and radio resource configuration information.

In Step S906, after completing the SRB1 bearer and the radio resource configuration, the terminal sends an RRC connection setup complete message to the base station.

In Step S908, the base station sends a registration request message to an AMF. It may be understood that the registration request message may be sent by the terminal to the base station. The registration request message may include parameters such as a registration type, a UE ID, a UE capability, and a requested slice.

In Step S910, the AMF sends a registration accepted message to the base station. The registration accepted message may include ID information of the terminal group in which the terminal is located.

In Step S912, the base station sends a UE capability inquiry message to the terminal to query a capability of a terminal.

In Step S914, the terminal sends UE capability information to the base station to report UE capability information to the base station.

In Step S916, the base station sends UE capability information indication to the AMF to update UE capability information in the AMF.

In Step S918, the base station sends an RRC configuration message to the terminal, where the RRC configuration message may include ID information of the terminal group in which the terminal is located.

In Step S920, the terminal may send an RRC configuration complete message to the base station.

In Step S922, the terminal sends a registration complete message to the AMF.

In Step S924, after the foregoing registration is completed, the AMF may trigger paging. Specifically, the AMF may send a paging message to the base station, and the paging message may include UE ID information and ID information of the terminal group. Since terminals are grouped by the AMF, the AMF sends both an ID of a paged terminal and an ID of the terminal group to the base station. In some other embodiments, the AMF may alternatively send, to the base station before paging, the ID information of the terminal group to which the terminal belongs. When the terminal is paged, the AMF may only send the ID of the terminal to the base station, and the base station determines, based on the ID of the terminal, the terminal group to which the paged terminal belongs.

In step S926, after receiving the paging message sent by the AMF, the base station may first send PEI to the terminal in the terminal group to instruct the terminal in the terminal group to receive paging indication information. Optionally, the PEI includes the ID information of the terminal group.

In step S928, the base station may send a paging message to the terminal. When the base station sends the paging message, the base station may send paging indication information on a PO group corresponding to the terminal group to indicate a resource location in which the paging message is located.

Figure 10:
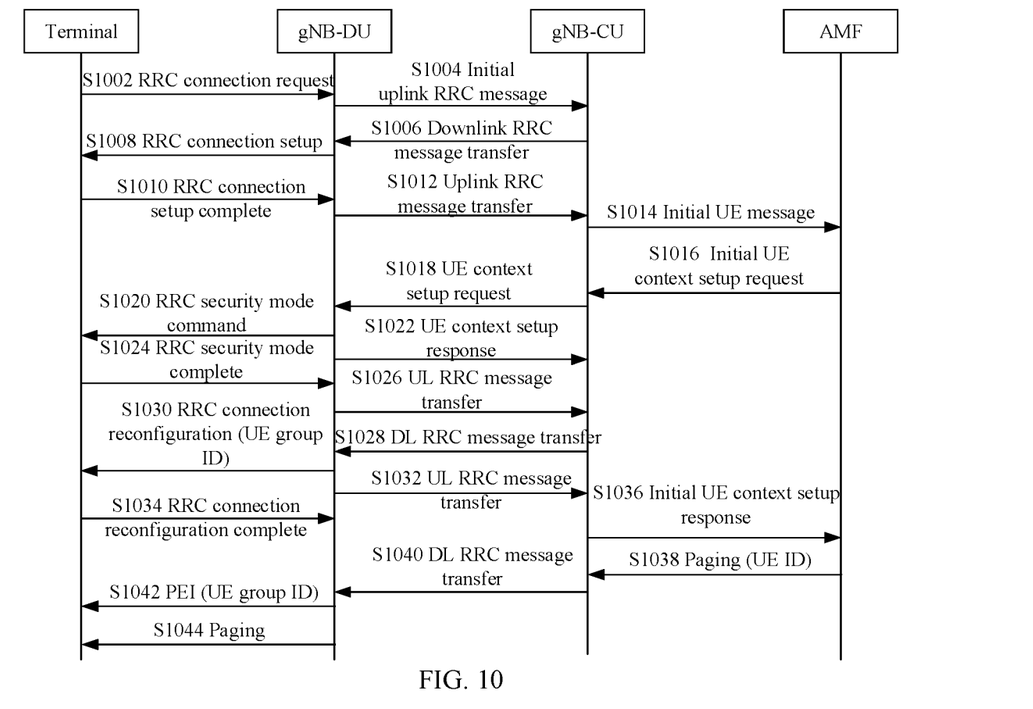
FIG. 10 is a schematic flowchart of an RRC connection setup process according to an embodiment of the present application.

FIG. 10 is a schematic flowchart of an RRC connection setup procedure. The RRC connection setup procedure of a terminal is described below by using an example in which a base station includes a gNB-DU and a gNB-CU. The method illustrated in FIG. 10 includes Step S1002 to Step S1044.

In Step S1002, the terminal sends an RRC connection request to the gNB-DU.

In Step S1004, the gNB-DU sends an initial uplink (UL) RRC message to the gNB-CU. The gNB-DU includes an RRC message, and if the terminal is allowed, a corresponding lower layer configuration for a UE is included in an F1AP initial UL RRC message transfer message and transmitted to the gNB-CU.

In Step S1006, the gNB-CU sends downlink (DL) RRC message transfer to the gNB-DU. The gNB-CU allocates a gNB-CU UE F1AP ID to the terminal and generates an RRC connection setup message for the terminal.

In Step S1008, the gNB-DU sends an RRC connection setup message to the terminal.

In Step S1010, the terminal sends an RRC connection setup complete message to the gNB-DU.

In Step S1012, the gNB-DU sends UL RRC message transfer to the gNB-CU. After receiving the RRC connection setup complete message sent by the terminal, the gNB-DU encapsulates the RRC message in an F1AP UL RRC message transfer message and sends it to the gNB-CU.

In Step S1014, the gNB-CU sends an initial UE message to the AMF.

In Step S1016, the AMF sends an initial UE context setup request to the gNB-CU.

In Step S1018, the gNB-CU sends a UE context setup request to the gNB-DU to set up UE context in the gNB-DU. In this message, an RRC security mode command message may further be encapsulated.

In Step S1020, the gNB-DU sends an RRC security mode command message to the terminal.

In Step S1022, the gNB-DU sends a UE context setup response to the gNB-CU.

In Step S1024, in response to the RRC security mode command message, the terminal sends RRC security mode complete to the gNB-DU.

In Step S1026, the gNB-DU sends UL RRC message transfer to the gNB-CU. The gNB-DU encapsulates the RRC message sent by the terminal in the F1AP UL RRC message and sends it to the gNB-CU.

In Step S1028, the gNB-CU sends a downlink (DL) RRC message transfer message to the gNB-DU. The gNB-CU generates an RRC connection reconfiguration message and encapsulates the RRC connection reconfiguration message in the F1AP DL RRC message transfer message.

In Step S1030, the gNB-DU sends RRC connection reconfiguration to the terminal to perform UE resource reconfiguration. For example, the RRC connection reconfiguration includes reconfiguration of SRB1 and radio resource configuration, setup of SRB2, data radio bearer (DRB) (including default bearer), and the like. The RRC connection configuration may carry ID information of a terminal group in which the terminal is located.

In Step S1032, the gNB-DU sends UL RRC message transfer to the gNB-CU. The gNB-DU encapsulates the RRC message sent by the terminal in the F1AP UL RRC message and sends it to the gNB-CU.

In Step S1034, the terminal sends RRC connection reconfiguration complete to the gNB-DU to indicate that the resource reconfiguration is completed.

In Step S1036, the gNB-CU sends an initial UE context setup response to the AMF to indicate that UE context setup is completed.

In Step S1038, after the foregoing RRC connection is completed, the AMF may initiate paging to the terminal. The AMF sends a paging message including an ID of the terminal to the gNB-CU. Since terminal groups are grouped by the base station, the AMF may only carry only UE ID when sending the paging message to the base station.

In Step S1040, the gNB-CU sends a downlink (DL) RRC message transfer message to the gNB-DU.

In Step S1042, the gNB-DU sends PEI to the terminal, where the PEI carries an ID of a terminal group in which the terminal is located. After receiving the UE ID, the gNB-DU may determine, based on the UE ID, the terminal group to which a paged terminal belongs. The gNB-DU may then send the PEI to the terminal of the terminal group to instruct the terminal of the terminal group to receive paging indication information. Optionally, the PEI may include ID information of the terminal group.

In step S1044, the gNB-DU may send the paging message to the terminal. The gNB-DU may send the paging indication information in a PO group corresponding to the terminal group to indicate a resource location in which the paging message is located.

The methods embodiments of the present application are described in detail above with reference to FIG. 1 to FIG. 10. The apparatus embodiments of the present application are described in detail below with reference to FIG. 11 to FIG. 13. It should be understood that the description of the method embodiments corresponds to the description of the apparatus embodiments, and therefore, for parts that are not described in detail, reference may be made to the foregoing method embodiments.

Figure 11:
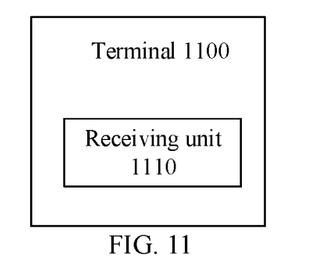
FIG. 11 is a schematic structural diagram of a terminal according to an embodiment of the present application.

FIG. 11 is a schematic structural diagram of a terminal according to an embodiment of the present application. A terminal 1100 in FIG. 11 may correspond to a terminal in the first terminal group described above. The terminal 1100 includes a receiving unit 1110.

The receiving unit 1110 is configured to receive first PEI sent by a network device, where the first PEI is used to indicate whether the terminal in the first terminal group needs to receive paging indication information, and the first terminal group corresponds to a first PO group.

Optionally, in some embodiments, one paging cycle includes a plurality of PO groups, the first PO group is one of the plurality of PO groups, and a quantity of the plurality of PO groups is the same as a quantity of terminal groups.

Optionally, in some embodiments, the plurality of PO groups has a same quantity of POs.

Optionally, in some embodiments, the POs in the plurality of PO groups do not overlap.

Optionally, in some embodiments, POs in the one paging cycle sequentially constitute the plurality of PO groups.

Optionally, in some embodiments, a start PDCCH monitoring occasion of a PO in the first PO group is determined based on a parameter firstPDCCH-MonitoringOccasionOf PO.

Optionally, in some embodiments, a resource location at which the terminal device receives the first PEI is indicated by a CORESET #0 or a CORESET in an SIB1.

Optionally, in some embodiments, the terminal device in the first terminal group is determined based on at least one of a capability, a mode, and service information of the terminal device.

Optionally, in some embodiments, ID information of the first terminal group is sent by a core network device to the terminal device through a registration accepted message.

Optionally, in some embodiments, the ID information of the first terminal group is sent by an access network device to the terminal device through an RRC connection configuration message.

Figure 12:
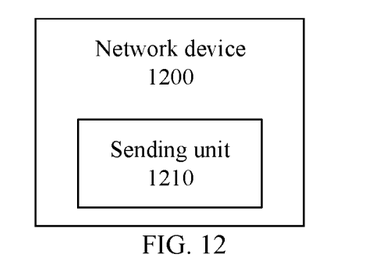
FIG. 12 is a schematic structural diagram of a network device according to an embodiment of the present application.

FIG. 12 is a schematic structural diagram of a network device according to an embodiment of the present application. A network device 1200 in FIG. 12 may correspond to any of the network devices or base stations described above. The network device 1200 includes a sending unit 1210.

The sending unit 1210 is configured to send first PEI to a terminal in a first terminal group, where the first PEI is used to indicate whether the terminal in the first terminal group needs to receive paging indication information, and the first terminal group corresponds to a first PO group.

Optionally, in some embodiments, one paging cycle includes a plurality of PO groups, the first PO group is one of the plurality of PO groups, and a quantity of the plurality of PO groups is the same as a quantity of terminal groups.

Optionally, in some embodiments, the plurality of PO groups has a same quantity of POs.

Optionally, in some embodiments, the POs in the plurality of PO groups do not overlap.

Optionally, in some embodiments, POs in the one paging cycle sequentially constitute the plurality of PO groups.

Optionally, in some embodiments, a start PDCCH monitoring occasion of a PO in the first PO group is determined based on a parameter firstPDCCH-MonitoringOccasionOfPO.

Optionally, in some embodiments, a resource location at which the terminal device receives the first PEI is indicated by a CORESET #0 or a CORESET in an SIB1.

Optionally, in some embodiments, the terminal device in the first terminal group is determined based on at least one of a capability, a mode, and service information of the terminal device.

Optionally, in some embodiments, ID information of the first terminal group is sent by a core network device to the terminal device through a registration accepted message.

Optionally, in some embodiments, the ID information of the first terminal group is sent by an access network device to the terminal device through an RRC connection configuration message.

Figure 13:
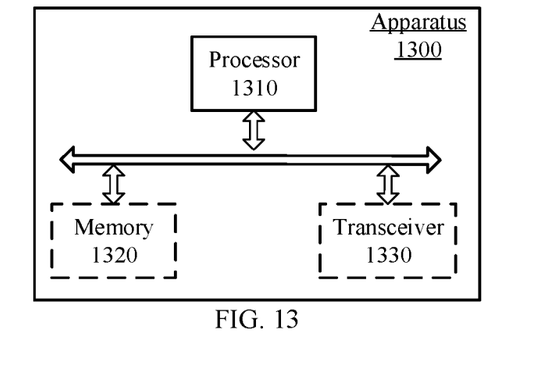
FIG. 13 is a schematic structural diagram of a communications apparatus according to an embodiment of the present application.

FIG. 13 is a schematic structural diagram of a wireless communications apparatus according to an embodiment of the present application. The dashed lines in FIG. 13 indicate that the unit or module is optional. The apparatus 1300 may be configured to implement the methods described in the foregoing method embodiments. The apparatus 1300 may be a chip, a terminal device, or a network device.

The apparatus 1300 may include one or more processors 1310. The processor 1310 may allow the apparatus 1300 to implement the methods described in the foregoing method embodiments. The processor 1310 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like.

The apparatus 1300 may further include one or more memories 1320. The memory 1320 stores a program that may be executed by the processor 1310 to cause the processor 1310 to perform the methods described in the foregoing method embodiments. The memory 1320 may be independent of the processor 1310 or may be integrated in the processor 1310.

The apparatus 1300 may further include a transceiver 1330. The processor 1310 may communicate with another device or chip through the transceiver 1330. For example, the processor 1310 may send and receive data to and from another device or chip through the transceiver 1330.

An embodiment of the present application further provides a computer-readable storage medium for storing a program. The computer-readable storage medium may be applied to the terminal or the network device provided in the embodiments of the present application, and the program causes a computer to perform the methods to be performed by the terminal or the network device in various embodiments of the present application.

An embodiment of the present application further provides a computer program product. The computer program product includes a program. The computer program product may be applied to the terminal or the network device provided in the embodiments of the present application, and the program causes a computer to perform the methods to be performed by the terminal or the network device in various embodiments of the present application.

An embodiment of the present application further provides a computer program. The computer program may be applied to the terminal or the network device provided in the embodiments of the present application, and the computer program causes a computer to perform the methods to be performed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "comprise" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, "B that is corresponding to A" means that B is associated with A, and B may be determined based on A. However, it should also be understood that, determining B based on A does not mean determining B based only on A, but instead B may be determined based on A and/or other information.

In the embodiments of the present application, the term "corresponding" may mean that there is a direct or indirect correspondence between the two, or may mean that there is an association relationship between the two, or may mean that there is a relationship such as indicating and being indicated, or configuring and being configured.

In the embodiments of the present application, "pre-defined" or "pre-configured" may be implemented by pre-storing corresponding codes, tables, or other forms that may be used to indicate related information in devices (for example, including the terminal device and the network device), and a specific implementation thereof is not limited in the present application. For example, pre-defined may refer to defined in the protocol.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, the term "and/or" is merely used to describe an association relationship between associated objects, indicating that there may be three relationships. For example, A and/or B may indicate that: only A exists, both A and B exist, and only B exists. In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to an actual need to achieve the objectives of the solutions of the embodiments.

In addition, function units in the embodiments of the present application may be integrated into one processing unit, or each of the units may exist alone physically, or two or more units are integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:
receiving, by a terminal, a paging early indication (PEI) sent by a network device, wherein the terminal belongs to a terminal group in multiple terminal groups, the PEI indicates whether at least one terminal in the terminal group is to receive paging indication information, and wherein a paging cycle comprises a plurality of paging occasion (PO) groups;
determining, by the terminal, based on the PEI, whether to monitor a PO group in the plurality of PO groups; and
in response to determining to monitor the PO group based on the PEI, monitoring, by the terminal, the PO group to receive the paging indication information, wherein the monitoring the PO group comprises calculating an index of a paging occasion (PO) based on an index of the terminal group, a number of paging frames in the paging cycle, a number of POs in a paging frame, and a number of the multiple terminal groups, wherein the terminal group comprises more than one terminal.

2. The method according to claim 1, wherein each of the plurality of PO groups has a same quantity of POs.

3. The method according to claim 1, wherein POs in the plurality of PO groups do not overlap.

4. The method according to claim 3, wherein POs in the paging cycle sequentially form the plurality of PO groups.

5. The method according to claim 1, wherein a start physical downlink control channel (PDCCH) monitoring occasion of a PO in the PO group is determined based on a parameter firstPDCCH-MonitoringOccasionOfPO.

6. The method according to claim 1, wherein a resource location at which the terminal receives the PEI is indicated in a system information block (SIB1).

7. The method according to claim 1, wherein the terminal is allocated to the terminal group based on at least one of a capability, a mode, and service information of the terminal.

8. The method according to claim 1, wherein identification (ID) information of the terminal group is received by the terminal through a radio resource control (RRC) connection configuration message.

9. The method according to claim 1, wherein ID information of the terminal group is received by the terminal group from a core network device through a registration accepted message.

10. A terminal, comprising:
at least one processor; and
one or more memories coupled to the at least one processor and storing programming instructions for execution by the at least one processor to cause the terminal to perform operations comprising:
receiving, by the terminal, a paging early indication (PEI) sent by a network device, wherein the terminal belongs to a terminal group in multiple terminal groups, the PEI indicates whether at least one terminal in the terminal group is to receive paging indication information, and wherein a paging cycle comprises a plurality of paging occasion (PO) groups;
determining, by the terminal, based on the PEI, whether to monitor a PO group in the plurality of PO groups; and
in response to determining to monitor the PO group based on the PEI, monitoring, by the terminal, the PO group to receive the paging indication information, wherein the monitoring the PO group comprises calculating an index of a paging occasion (PO) based on an index of the terminal group, a number of paging frames in the paging cycle, a number of POs in a paging frame, and a number of the multiple terminal groups, wherein the terminal group comprises more than one terminal.

11. The terminal according to claim 10, wherein each of the plurality of PO groups has a same quantity of POs.

12. The terminal according to claim 10, wherein POs in the plurality of PO groups do not overlap.

13. The terminal according to claim 12, wherein POs in the paging cycle sequentially form the plurality of PO groups.

14. The terminal according to claim 10, wherein a start physical downlink control channel (PDCCH) monitoring occasion of a PO in the PO group is determined based on a parameter firstPDCCH-MonitoringOccasionOfPO.

15. The terminal according to claim 10, wherein a resource location at which the terminal receives the PEI is indicated in a system information block (SIB1).

16. The terminal according to claim 10, wherein the terminal is allocated to the terminal group based on at least one of a capability, a mode, and service information of the terminal.

17. The terminal according to claim 10, wherein identification (ID) information of the terminal group is received by the terminal through a radio resource control (RRC) connection configuration message.

18. The terminal according to claim 10, wherein ID information of the terminal group is received by the terminal group from a core network device through a registration accepted message.

19. One or more non-transitory computer-readable media storing computer instructions, that when executed by one or more processors, cause a computer to perform operations comprising:

receiving, by a terminal, a paging early indication (PEI) sent by a network device, wherein the terminal belongs to a terminal group in multiple terminal groups, the PEI indicates whether at least one terminal in the terminal group is to receive paging indication information, and wherein a paging cycle comprises a plurality of paging occasion (PO) groups;

determining, by the terminal, based on the PEI, whether to monitor a PO group in the plurality of PO groups; and in response to determining to monitor the PO group based on the PEI, monitoring, by the terminal, the PO group to receive the paging indication information, wherein the monitoring the PO group comprises calculating an index of a paging occasion (PO) based on an index of the terminal group, a number of paging frames in the paging cycle, a number of POs in a paging frame, and a number of the multiple terminal groups, wherein the terminal group comprises more than one terminal.

20. The one or more non-transitory computer-readable media according to claim 19, wherein each of the plurality of PO groups has a same quantity of POs.

* * * * *